United States Patent Office 3,481,216
Patented Dec. 2, 1969

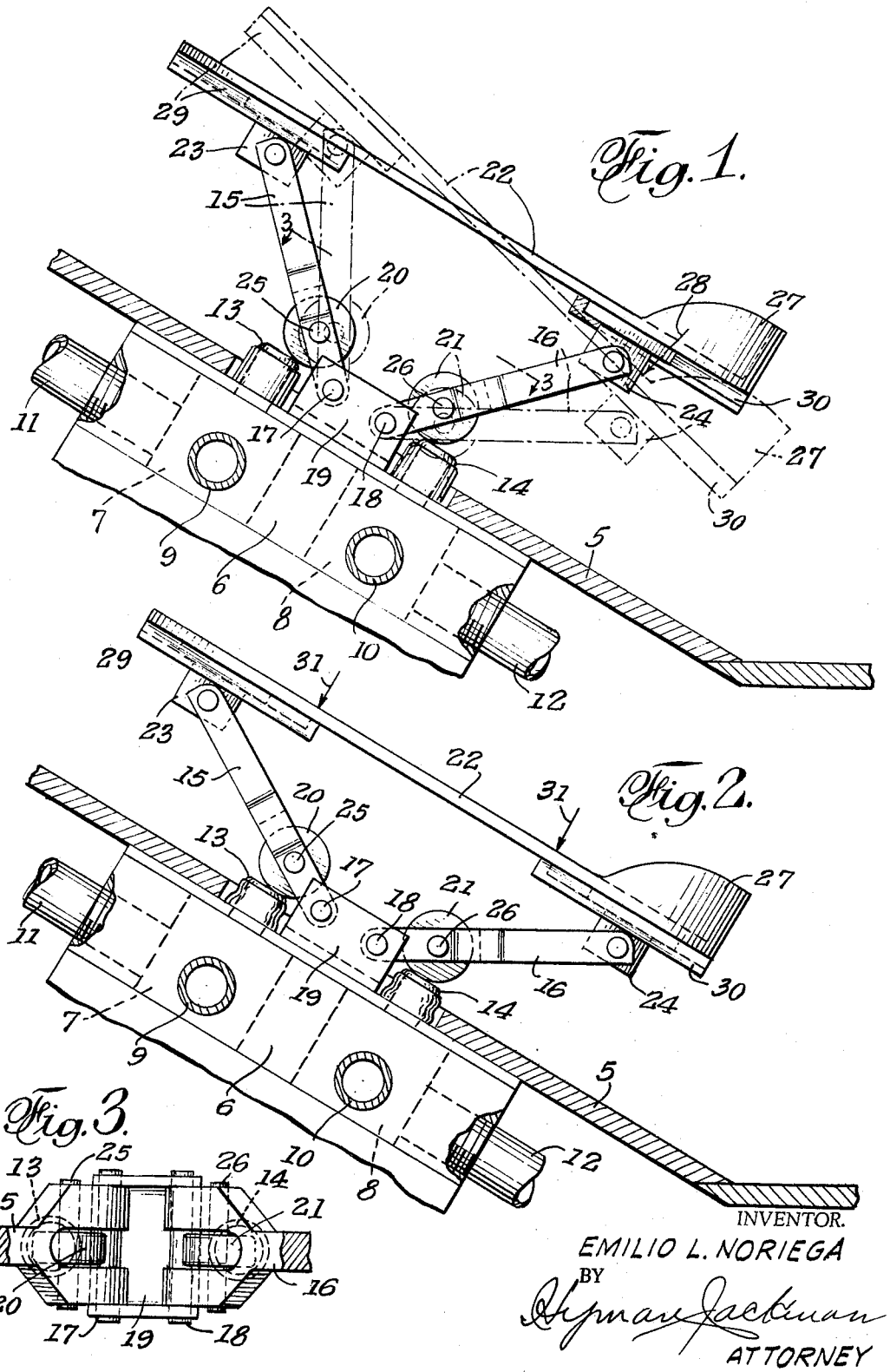

3,481,216
AIR BRAKE PEDAL
Emilio L. Noriega, 3745 N. Winston Drive,
El Monte, Calif. 91731
Filed Nov. 13, 1967, Ser. No. 682,383
Int. Cl. G05g 1/14, 9/04
U.S. Cl. 74—478    5 Claims

ABSTRACT OF THE DISCLOSURE

An air brake pedal mounted for foot-controlled movement for either selectively and sequentially, or simultaneously, opening the brake-operating air lines to the air brakes of a tractor vehicle and the trailer towed thereby.

---

This invention relates to a brake pedal for controlling flow of compressed air to air brakes of combination vehicles, such as a vehicle comprising a tractor and a trailer, both of which are provided with air-operated brakes.

Braking of a combination vehicle, as above, at different times, entails braking of the tractor only, of the trailer only, both simultaneously or sequentially, tractor first or trailer first.

The present invention has for an object to provide an air brake pedal which facilitates such selective operation, thereby providing for safety that obviates jack-knifing of the trailer on the tractor and, generally, provides for complete control of the vehicle in a wide range of speeds.

Another object of the invention is to provide an air brake pedal that is sensitive in operation in that it responds readily to foot manipulation in the different braking forces required for safe and rapid stopping or slowing of a compound vehicle.

This invention also has for its objects to provide such means that are positive in operation, convenient in use, easily installed in a working position and easily disconnected therefrom, economical of manufacture, relatively simple, and of general superiority and serviceability.

The above objects are realized in a brake pedal of the character referred to that comprises a foot plate that, at opposite ends, is provided with longitudinal slideways, a pair of a similar levers pivotally mounted on fixedly spaced pivots and extending oppositely, outwardly from said pivots, the upper ends of the levers being provided with shoes that are slidingly engaged in said slideways, and a roller carried on each lever adjacent the pivot thereof, said rollers being positioned and engaging a pair of actuator stems of air valves which connect to lines that conduct air from a source of compressed air and which are mounted in a block on which the pivots of said levers are carried.

The invention also comprises novel details of construction and novel combinations and arrangements of parts, which will more fully appear in the course of the following description which is based on the accompanying drawing. However, said drawing merely shows, and the following description merely describes, one embodiment of the present invention, which is given by way of illustration or example only.

In the drawing, like reference characters designate similar parts in the several views.

FIG. 1 is a side elevational view, partly in section, of an air brake pedal according to the present invention, shown in full lines in unoperated position, and in dot-dash lines operating and opening one of the air valves.

FIG. 2 is a similar view of said air brake pedal showing the same in the position in which both air valves are operated and opened to air flow therethrough.

FIG. 3 is a cross-sectional view as taken on the line 3—3 of FIG. 1.

As shown in FIGS. 1 and 2, the present brake pedal, as usual, is mounted on a sloping floor board 5, the same being located in the tractor vehicle in the usual position forward of the operator of said vehicle. A block 6 is shown as secured to the under side of said floor board, the block being provided with two air valves 7 and 8, the former with an air supply line 9 and the latter with an air supply line 10. Said valves are normally closed and, are opened to brake-operating air lines 11 and 12, respectively, upon depression or comparable actuation of valve stems 13 and 14, thereby effecting flow from the supply lines 9 and 10 to the brake-operating lines 11 and 12. The above is intended as merely exemplary of air valves such as may be provided for being operated by the present air brake pedal.

Said pedal is shown as a pair of levers 15 and 16 extending oppositely outwardly from respective spaced pivots 17 and 18 on a bracket 19 above the floor board 5, rollers 20 and 21, or comparable follower members, being provided on said levers and having respective engagement with the valve stems 13 and 14 to depress the same when one or the other or both levers are depressed toward the floor board, a foot plate 22 being slidingly connected at both ends to slide blocks 23 and 24 on the ends of said levers 15 and 16. It will be seen that the only supports for the foot plate 22 comprise the blocks 23 and 24.

The levers 15 and 16 are preferably bifurcated, as shown in FIG. 3, the rollers carried by the levers residing in the bifurcations so a symmetrical and centered arrangement is provided.

The bracket 19 is shown as a channel member with the bifurcated ends of the levers disposed between the flanges thereof and the pivots 17 and 18 comprising pins that extend across the bracket into holes in said flanges.

The rollers 20 and 21 are preferably free to rotate with or on the respective pins 25 and 26 which mount them on the levers 15 and 16.

The foot plate 22 has sufficient longitudinal extent to accommodate the shoes of men, as well as of women, so that the same, by pressure of the foot, may press down on one end or the other of said plate or on both ends simultaneously or sequentially, as hereinbefore indicated. The plate 22 that is shown is provided with a heel-locating wall 27 which is on the lower end of the plate which, in its normal, unoperated position, is preferably parallel to the floor board 5.

As shown in FIG. 1, when the heel end of plate 22 is depressed in the direction of arrow 28, according to the dot-dash line position thereof, the lever 16 is depressed on its pivot and the roller 21 depresses the stem 14 opening the valve 8 so that pressure air in the supply line 10 flows in the braking line 12 to operate the brakes of one vehicle component, in this case, the trailer. As can be seen, the toe end of the plate 22 becomes upwardly tilted due to the upwardly swinging movement of the lever 15 which, therefore, moves away from the stem 13 which remains unoperated. A comparable but reverse operation is effected when pressure is applied to the toe end of the plate 22. There is little or no spreading movement of the levers 16, but rather a pivotal movement only thereof on their pivots, if operated as intended. Hence, the blocks 23 and 24 will retain their positions in longitudinal slideways 29 and 30, respectively, that are secured to the under face of the place 22.

When the foot of the operator is pushed down, according to the arrows 31 (FIG. 2), so there is little or no tilt of plate 22, the levers 15 and 16 will be caused to spread apart on their pivots 17 and 18 with the blocks 23 and 24 moving outwardly in these slideways so the rollers 20 and 21 simultaneously engage and depress the valve stems 13 and 14. As a consequence, both valves 7 and 8 are opened and the brakes of both components of the combination vehicle will be operated. The foot action may involve depressing the toe or heel end of the plate 22 first so there is a flexibility of operation, under control of the operation to operate the brakes in any desired sequential manner.

While the foregoing has illustrated and described what is now contemplated to be the best mode of carrying out the invention, the construction is, of course, subject to modification without departing from the spirit and scope of the invention.

Having thus described this invention, what is claimed and desired to be secured by Letters Patent is:

1. An air brake pedal for depressing the stems of two normally-closed air valves in two air lines to open said valves, one to operate the brakes of a tractor vehicle and the other to operate the brakes of a trailer attached to said vehicle, said pedal comprising:
   (a) two pivoted levers extending oppositely outwardly and provided with valve-stem-engaging rollers,
   (b) a foot plate, and
   (c) means pivotally connected to the ends of said levers opposite the pivoted ends thereof and in sliding support engagement with the opposite ends of the foot plate,
   (d) foot pressure on the foot plate, through connection by said blocks with said opposite lever ends, operatively pivoting said levers so that the roller of at least one of said levers engages and depresses the valve stem with which it is operatively associated.

2. An air brake pedal according to claim 1 in which the pivoted ends of said levers are spaced from each other.

3. An air brake pedal according to claim 1 in which the mentioned means comprises blocks pivotally connected one to each lever end, and slideways on the foot plate in which said blocks are slidingly engaged.

4. An air brake pedal according to claim 3 in which one end of the foot plate is provided with a heel-locating wall.

5. An air brake pedal according to claim 3 in which the pivoted ends of said levers are spaced from each other.

References Cited

UNITED STATES PATENTS

| | | |
|---|---|---|
| 1,711,712 | 5/1929 | Yost. |
| 2,133,275 | 10/1938 | Andres et al. |
| 2,654,266 | 10/1953 | Edelen _____ 74—569 X |
| 2,766,640 | 10/1956 | Ellsworth _____ 74—478 |
| 2,878,908 | 3/1959 | Winkleman. |
| 2,931,246 | 4/1960 | Lerman _____ 74—560 X |

FRED C. MATTERN, JR., Primary Examiner

C. F. GREEN, Assistant Examiner

U.S. Cl. X.R.

74—560